United States Patent [19]
Nakamura et al.

[11] Patent Number: 5,321,830
[45] Date of Patent: Jun. 14, 1994

[54] RESET METHOD WHEN ADAPTOR MODULE IS FAULTY AND COMPUTER SYSTEM EXECUTING SAME

[75] Inventors: Youichi Nakamura, Yokohama; Makoto Kimura, Chiba, both of Japan

[73] Assignee: Fujitsu Limited, Kawasaki, Japan

[21] Appl. No.: 776,325

[22] PCT Filed: Apr. 12, 1991

[86] PCT No.: PCT/JP91/00488
§ 371 Date: Jan. 10, 1992
§ 102(e) Date: Jan. 10, 1992

[87] PCT Pub. No.: WO91/16678
PCT Pub. Date: Oct. 31, 1991

[30] Foreign Application Priority Data

Apr. 13, 1990 [JP] Japan ................................ 2-098818

[51] Int. Cl.[5] ............................................. G06F 9/30
[52] U.S. Cl. .................................... 395/575; 371/11.3
[58] Field of Search ............... 395/575; 371/10.1, 10.2, 371/11.3, 12, 13

[56] References Cited

U.S. PATENT DOCUMENTS 4,802,119 1/1989 Heene et al. .
4,901,232 2/1990 Harrington et al. ................. 364/200

FOREIGN PATENT DOCUMENTS 0356538 3/1990 European Pat. Off. .

OTHER PUBLICATIONS

Operating System/2 ® Standard Edition Version 1.2, ©1989, p. 93.
Australian Examination Report, Canberra, Australia, issued Jun. 19, 1992.
Patent Abstract of Japan, vol. 6, No. 66, Apr. 27, 1982 for IPA 57 006 920.
Patent Abstract of Japan, vol. 6, No. 79, Jan. 26, 1982 for IPA 57 014 926.
European Search Report, The Hague, search mailed Jan. 6, 1993.

*Primary Examiner*—Vincent P. Canney
*Attorney, Agent, or Firm*—Staas & Halsey

[57] ABSTRACT

A computer system and method executing a reset method when an adaptor module is faulty is provided. The system comprises processor modules (1), adaptor modules (2), a system bus (3) connecting the processor modules (1) and the adaptor modules (2), devices (4) and lines connected to the adaptor module (2). When the adaptor module (2) is faulty and enters a special status, the method comprises a step of issuing an instruction by which the processor module (1) resets the adaptor module (2), and another step in that when the processor module (1) detects the special status of the adaptor module (2), the adaptor module (2) starts to operate by various predetermined operations. By using the above method, even when the adaptor module (2) has entered a non-operational status, the adaptor module (2) is initialized and a reset capable of restarting the system can be carried out.

12 Claims, 9 Drawing Sheets

RST : RESET
IB : INNER BUS

RESET METHOD WHEN ADAPTOR MODULE IS FAULTY AND COMPUTER SYSTEM EXECUTING SAME

TECHNICAL FIELD

The present invention relates to a reset method for causing a reset operation when an adaptor module is faulty in a computer system comprising processor modules, adaptor modules, a system bus connecting the two types of modules, and devices or lines connected to the adaptor modules.

BACKGROUND ART

A general computer system includes a plurality of processor modules and adaptor modules connected to a system bus, and further, devices or lines connected to the adaptor modules, but the module cannot be inserted at the time when the power source is turned ON. The reason is that when one of modules is faulty, logical circuits in each module are constituted so that the necessary data for fault analysis are held. For this reason, each module is held in one of various statuses and is not reset automatically.

Accordingly, when a fault occurs, if in response to the faulty status, the system reset, namely, the power source reset, is not carried out, a dump instruction, diagnostic instruction, or the like cannot be received. However, occurence of the system reset gives users of the computer system difficulty. Therefore, a reset method wherein the users do not experience difficulties even when the adaptor module is in a faulty status, the adaptor module is initialized from the processor module, and the necessary data for the fault analysis can be recorded, becomes necessary.

DISCLOSURE OF THE INVENTION

An object of the present invention is to provide a reset method for causing a reset operation when an adaptor module is faulty and a computer system executing the same wherein even when the adaptor module cannot operate, the adaptor module can be initialized efficiently, and the fault information in the adaptor module can be stored and restarted.

As one aspect of the present invention, there is provided a reset method for causing a reset operation when an adaptor module is faulty in a computer system having processor modules, adaptor modules, a system bus connecting the processor modules and the adaptor modules, and a plurality of devices or lines connected to the adaptor modules. Each of the adapter modules has an interface portion for receiving and decoding instructions issued from the processor module and for controlling the connection to the processor module, and an adaptor control portion for controlling data transfer between the system bus and the devices or lines based on the decoded information from the interface portion. The method of the invention includes a first step in which the processor module issues a reset instruction having a code or flag designating kinds of reset operations in the reset instruction to the adaptor module; a second step in which the adaptor module receives a reset instruction issued by the processor module at the interface portion for the bus; and a third step in which the adaptor module executes various reset operations in accordance with kinds of operations designated by the code or flag in the reset instruction.

In another aspect of the invention, there is provided a computer system, comprising processor modules, adaptor modules, a system bus connecting the processor modules and the adaptor modules, and a plurality of devices and a plurality of lines connected to the adaptor modules. Each of the adapter modules has an interface portion for receiving and decoding instruction issued from the processor module and for controlling the connection to the processor module, and an adaptor control portion for controlling data transfer between the system bus and the device or lines based on the decoded information from the interface portion. The computer system includes generation means for generating a signal resetting the adaptor module by decoding a reset instruction issued from the processor module at the interface portion of the adaptor module when the adaptor module has attained a special status, and means for supplying instruction data from the processor module so that the adaptor module can be started in accordance with various predetermined operations when the processor module detects the special status of the adaptor module.

DETAILED DESCRIPTION OF THE INVENTION

Prior to explanations of embodiments of the invention, related art computer systems are explained with reference to FIGS. 1 to 4. Although an embodiment is explained with reference to FIGS. 1 to 4, the related art is explained by these as a matter of convenience.

Figure 1:
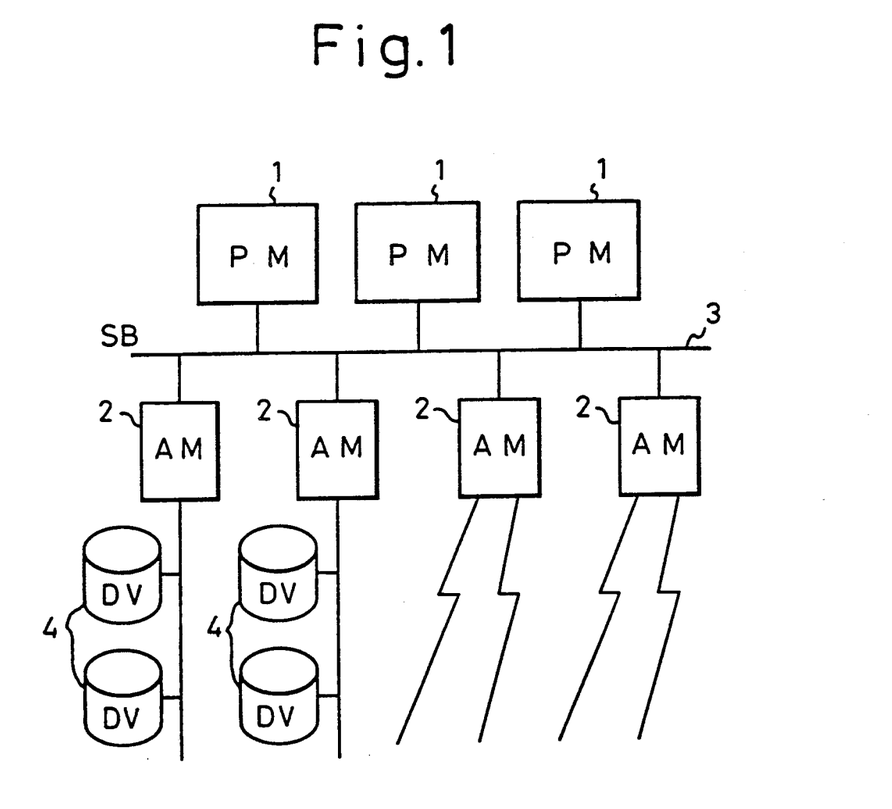
FIG. 1 is a block diagram illustrating a computer system according to an embodiment of the invention.
Figure 2:
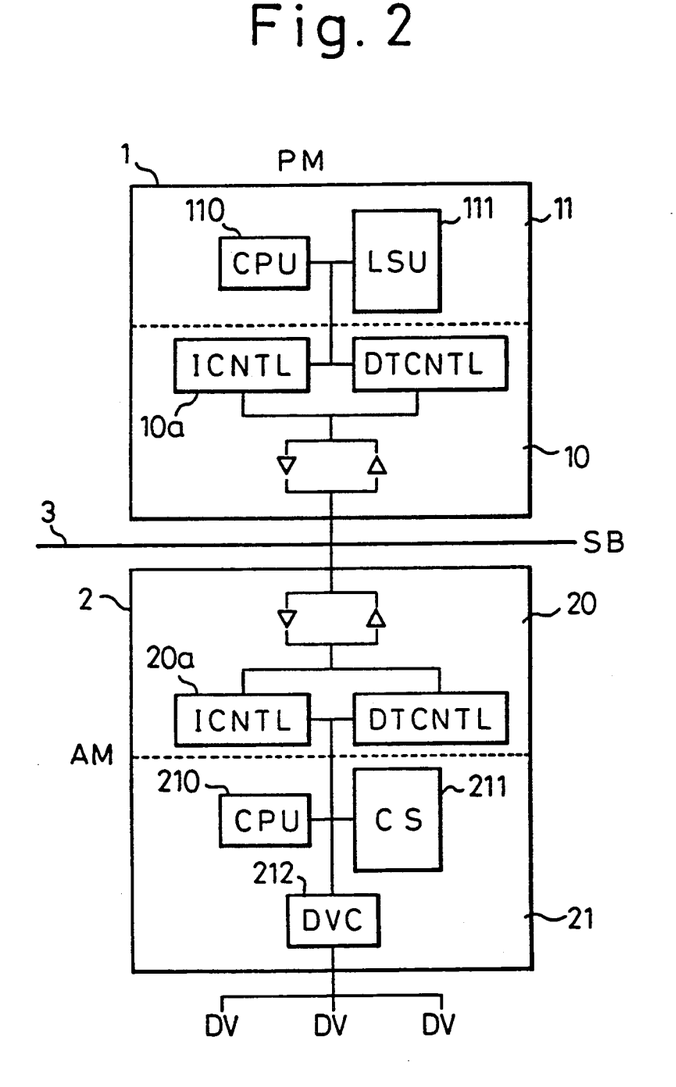
FIG. 2 is a diagram of a processor module and an adaptor module in the system of FIG. 1.
Figure 3:
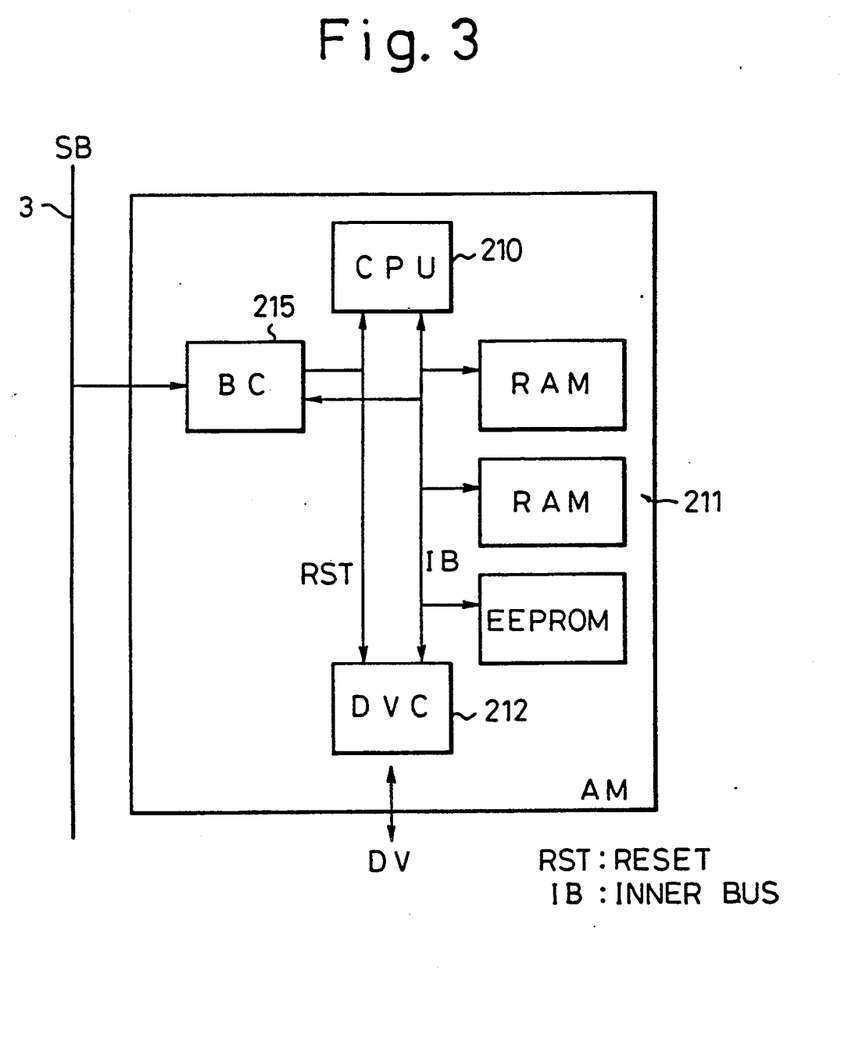
FIG. 3 is a partial block diagram illustrating details of the adaptor module in FIG. 2.
Figure 4:
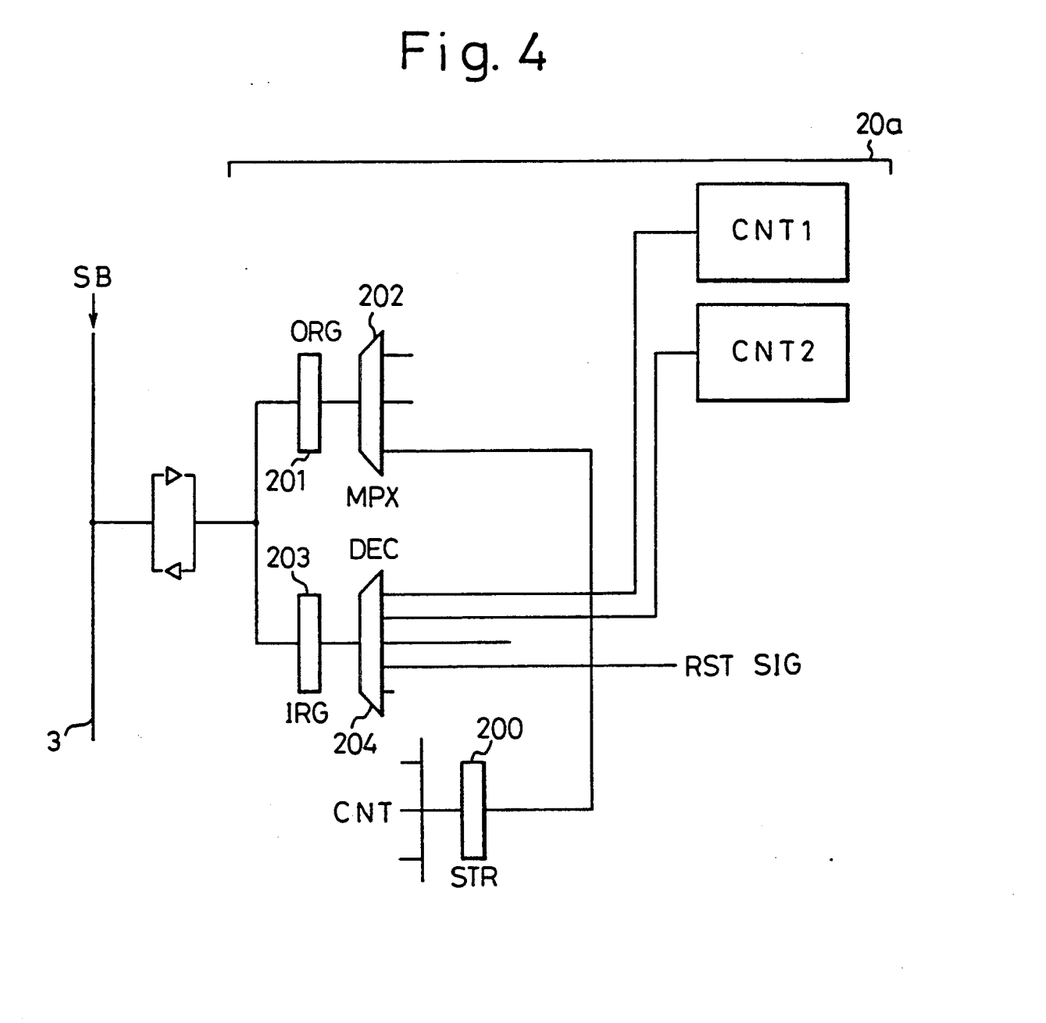
FIG. 4 is a block circuit diagram illustrating an instruction control portion of the adaptor module to explain a related art of the invention.

FIG. 1 is a block diagram of the computer system to which the invention is applied. FIG. 2 shows modules in the system, FIG. 3 shows a constitution of an adaptor control portion of an adaptor module in the module, and FIG. 4 shows an example of an interface portion of the adaptor module.

As shown in FIG. 1, in a general computer system, a processor module (PM) 1 is connected to an adaptor module (AM) 2 through a system bus (SB) 3, further, various devices (DV) 4 or lines are connected to the adaptor module 2. Usually, the processor module 1 controls the adaptor module 2 in accordance with instructions from a central processing unit (CPU) 110 in a control portion 11 shown in FIG. 2, reads data from the device 4, writes data to the device 4, or transmits or receives to or from the line.

The instructions issued from the central processing unit 110 of the control portion 11 in the processor module 1 include an instruction for controlling the adaptor module 2, an instruction for controlling the device 4 belonging to the adaptor module 2, and instructions for examining diagnosis or reliability, availability, maintainability or the like. Control software issues the necessary instruction by a determination from the status of the computer system and the status of the adaptor module 2.

The processor module 1 and the adaptor module 2, as shown in FIG. 2, for example, include interface portions 10 and 20 for controlling the interface to the system bus 3, a control portion 11, and an adaptor control portion 21. The control portion 11 of the processor module 1 controls the whole system by software executed by the central processing unit 110, the adaptor control portion 21 of the adaptor module 2 controls data transfer between a main storage unit (LSU) 111 of the processor module 1 and the device 4 in accordance with firmware (microprogram) executed by a control processor (CPU) 210.

The adaptor module 2 usually has four statuses, namely, an initial status, an operational status, an interruption status, and a non-operational status. The status becomes the initial status by a system reset after the power source of the system is turned ON, and becomes the operational status in accordance with the firmware executed by the above-mentioned control processor 210.

The above-mentioned statuses are set in a status register (STR) 200 provided in the interface portion 20 shown in FIG. 4. A special instruction issued from the central processing unit 110 of the control portion 11 in the processor module 1 is set in an input register (IRG) 203 of the interface portion 20 of the adaptor module 2, and an operating portion of the input register 203 is decoded by a decoder (DEC) 204 when the decoded signal is determined as a reading instruction for the status register 200, the contents of the status register 200 are read to the system bus 3 through a multiplexer (MPX) 202 and an output register (ORG) 201 of the interface portion 20, and are read into the processor module 1.

As mentioned above, the interface portion 20, whatever the status of the adaptor module 2 may be, can always receive instruction issued by the central processing unit 110 in the processor module 1.

In an operational status, the adaptor module 2 waits for the instruction from the processor module 1; wherein instruction is received in the above input register 203, the decode signal from the decoder 204 is validated, the control processor 210 executes the instruction, for example, data read or write for the device 4 in accordance with the firmware. The executing results are transmitted by the interruption to the processor module 1 through the interface portion 20, and the adaptor module 2 enters the interruption state by executing the firmware.

If the processor module 1 can receive the above result normally, the processor module 1 responds to the adaptor module 2 and a special response instruction is issued. When the adaptor module 2 receives a response instruction at the input register 203, it executes corresponding firmware, and again enters the operational status. The foregoing cycle is repeated and various operations in the system are carried out.

During the above cycles, when the adaptor module 2 detects a fault in the operation of the system or the adaptor module 2, the adaptor module enters the non-operational status. The non-operational status of the adaptor module is set in the status register 200.

As mentioned above, when the adaptor module 2 is faulty and non-operational, the adaptor module cannot change from non-operational status by its own operation.

In this case, the processor module 1 reads the status of the adaptor module 2 from the status register 200, and recognizes the non-operational status. The processor module may then issue, for example, dump instruction or diagnosis instruction to the adaptor module 2 using a special interface for diagnosis, namely, a scan-in-out-interface, and stores the fault information of the adaptor module 2 in the memory device. The above fault information, for example, is stored in a special area in the memory in the adaptor module 2, or is held in a latch in the adaptor module 2.

After that, the faulty adaptor module 2 may be returned to the initial status manually, for example, through a module reset operation (e.g., a push of the reset key provided in the module).

By causing a reset in this manner, a manual operation is necessary to restart the adaptor module 2 once it is in the non-operational status. Moreover, if the fault is not serious, yet the adaptor module 2 cannot be utilized, there arises a problem of ineffective utilization of resources.

Further, when the faulty adaptor module 2 is in the non-operational status and cannot always carry out the dump instruction or the like, there arises a further problem that the stored faulty status cannot be collected.

A computer system according to an embodiment of the invention is explained with reference to FIGS. 1 to 3. The explanations of portions already explained in the related art are abbreviated.

In FIGS. 1 and 2, the central processing unit 110 in the processor module 1 executes software, and by instruction from the software, the instruction issued for an instruction control portion (ICNTL) 10a in the processor module (hereinafter abbreviated as PM) 1 is required. Then, the instruction control portion 10a requests a right to use the bus to the system bus 3, and when the bus is acquired, the instruction from the control portion of the PM1 is issued to the adaptor module (hereinafter abbreviated as AM) 2 designated by the request.

When the AM2, as mentioned above, enters the initial status after the power source is turned ON, the firmware starts. If the status stored in the status register 200 provided in the interface portion 20 (instruction control portion 20a in FIG. 2) is in an operational state, the firmware monitors the instruction issued before, and the AM2 determines an instruction for itself, and the instruction is read.

The read instruction, containing the kind of instruction, is decoded using the decoder (DEC) 204 and is supplied to a control portion CNT1, CNT2 or the like.

Actually, the instruction issued from the PM1 is set in the input register (IRG) 203 regardless of the status of the AM2. But, the output of the decoder 204 is not validated.

The control portion (CNT1 or CNT2) executes the operation designated by the instruction in accordance with firmware operating under the instruction.

When the execution of the instruction ends, the instruction control portion 20a of the AM2 interrupts the PM1 to process the process end information, and the instruction control portion 20a becomes the interruption status by the firmware.

The PM1 receives the information normally; then, the normal reception is imparted to the AM2, and the information is received by the input register 203. Actually, the information is a special response instruction. Then, a special firmware is carried out based on a decoded output of the information; and again the operational state returns, and a successive process ends.

Figure 5:
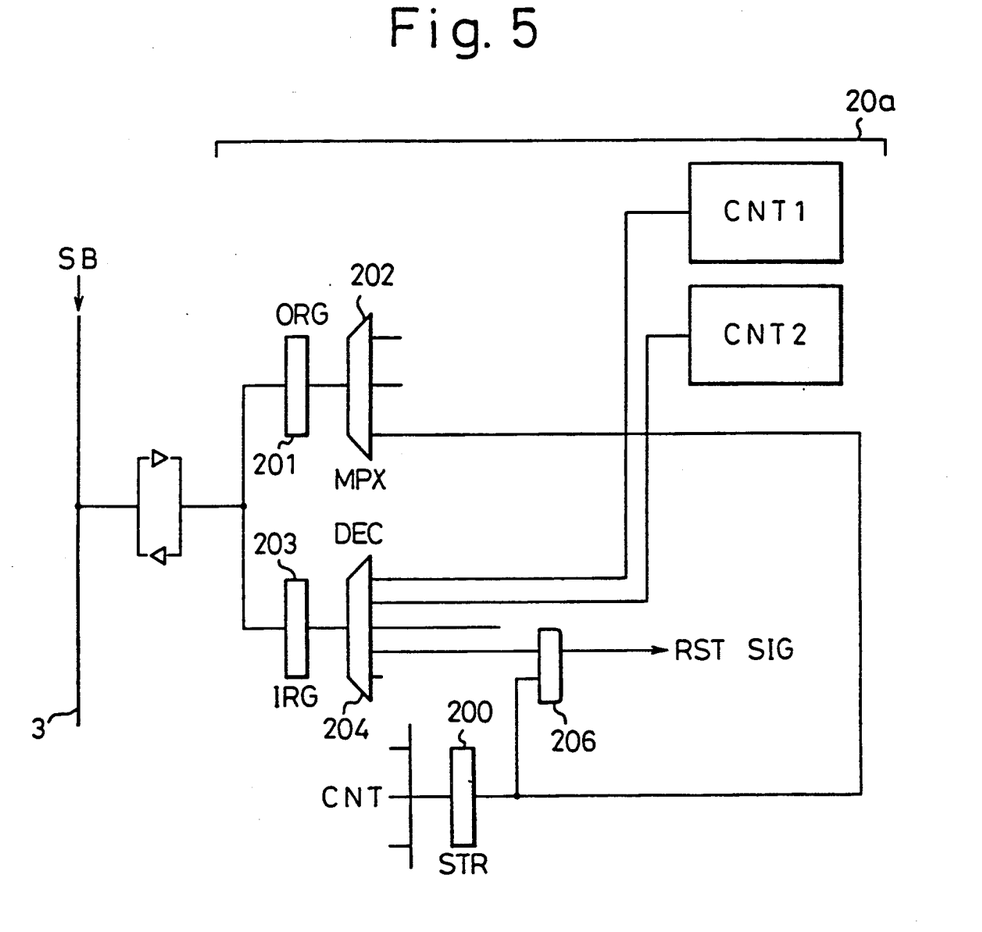
FIG. 5 is a block circuit diagram illustrating an instruction control portion of the adaptor module according to a first embodiment of the invention.

In FIG. 5, a constitution of the above-described instruction control portion (ICNTL) 20a in the AM2 is shown.

The instruction issued from the PM1 is set in the input register 203 provided in the instruction control portion 20a in the AM2 through the system bus 3.

At this time, if the AM2 is in an operational status, the decoded result by the decoder 204 is validated, and if the instruction is determined to be for itself, the instruction is sent out to the control portion (CNT1, CNT2 or the like). By providing the address with an address of an adaptor, I/O device or the like a destination of the instruction is determined.

The control portion comprises, for example, a control portion (CPU 210 in FIG. 2) of the AM2, a control portion (DVC) 212 of the device, and another control portion.

The instruction control portion 20a, as mentioned above, includes the status register 200 determining the status of each control portion and displaying the status of the AM2. The initial status, the operational status, interruption status, and non-operational status defined in the AM2 are set by the execution of the corresponding firmware.

When the status register 200 designates the non-operational state, only a circuit setting the instruction from the PM1 to the input register 203 operates, In the non-operational state, the output of the decoder 204 is not validated. Accordingly, sometimes the dump instruction issued from the PM1 cannot be received in the fault state.

Accordingly, in this embodiment, conjunction circuit 206, which obtains a logical product of the outputs of the status register 200 and the decoder 204, is provided. Further, even when the AM2 is in a non-operational status, the reset instruction from the PM1 is always monitored.

In the non-operational status, when the AM2 receives the reset instruction for itself, the conjunction circuit 206 is energized and the reset signal (RST SIG) is output.

By distributing the reset signal (RST SIG) to the necessary portion for initiating the AM2, if the AM2 is in a non-operational status the AM2 can still be initialized. Further, when the status of the AM2 is not in a non-operational status, by operations of the logical circuit, the reset instruction from the PM1 is ignored, and an unnecessary reset operation can be avoided.

Figure 6:
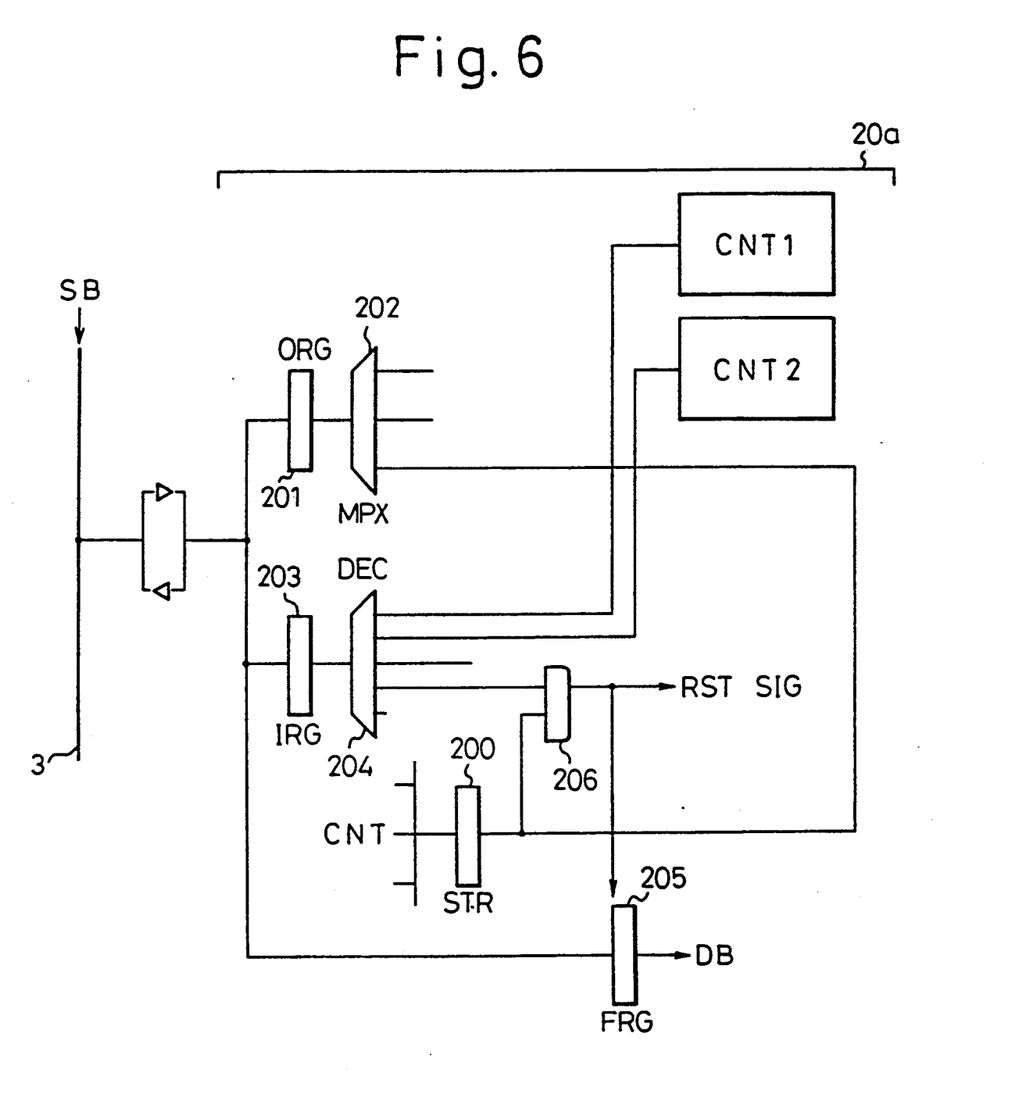
FIG. 6 is a block circuit diagram illustrating an instruction control portion of the adaptor module according to a second embodiment of the invention.

A second embodiment of the invention is explained with reference to FIG. 6. FIGS. 1 to 3 are referred to as in the first embodiment.

In this embodiment, a function register (FRG) 205, which can copy the contents of the input register (IRG) 203, is provided. Thus, when the status of the AM2 is non-operational, the AM2 receives the reset instruction for the AM2 from the PM1. When the reset signal (RST SIG) is output, a portion of or all of the reset instruction is written in the function register 205, and all or a portion of the initializing data sent by the preceding instruction of the reset instruction and set in the input register 203 are written in the function register 205. The output of the function register 205 is connected to a data bus (DB).

Further, when the AM2 receives the reset instruction for itself, the AM2 performs an initializing operation in accordance with the value set in the function register 205.

In this invention, the reset instruction only resets, but various reset operations are necessary. Accordingly, the reset instruction is defined using a plurality of codes, or the combination of the reset code with operation codes or a flag.

For example, if types of initialization in the reset instruction are defined by one bit, when the value is "0", the fault information is not preserved, and all of the hardware is initialized. If the above value is "1", everything other than the fault information is initialized. Then, when the reset instruction is set in the function register 205, if the value of the function register 205 is "0", the fault information is not preserved and all the hardware is initialized. If the value of the function register 205 is "1", everything other than the fault information is initialized, i.e., is reset and, for example, the dump instruction can be executed.

Further, by defining various values set in the function register 205 by the reset instruction, the reset operation having various statuses can be executed. As a result, a fine control over the initialization can be achieved.

The restart of the dump is explained with reference to the above circuit of FIG. 6. Referring to FIG. 3 showing details of the AM2, a bus control portion (BC) 215 receives an input/output instruction in accordance with the status of the AM2, and the reset instruction can be received in a special state, i.e., while the adaptor module is in a non-operational status. In the non-operational status, if the reset instruction issued by the PM1 is the instruction designated to collect dump information of the AM2, the BC portion 215 of the AM2 decodes the instruction, and as a result, reset signals for resetting portions other than the memory are turned ON, and the AM2 is initialized. When the reset is completed, the AM2 attains an operational status after an initial diagnosis, an adaptor dump ready interruption is issued to the PM1 issuing the reset instruction, and the dump instruction is expected. At that time, the AM2 responds to the instruction from the other PM1 as busy and does not receive the instruction so as to receive only the dump instruction from the issued PM1. Then, after receiving the dump instruction, the necessary contents of the memory in the adaptor are transferred to the PM1. When the transfer to the PM1 is completed, the usual reset instruction, i.e., the reset instruction not designating an operation after reset is issued to the AM2.

Figure 7:
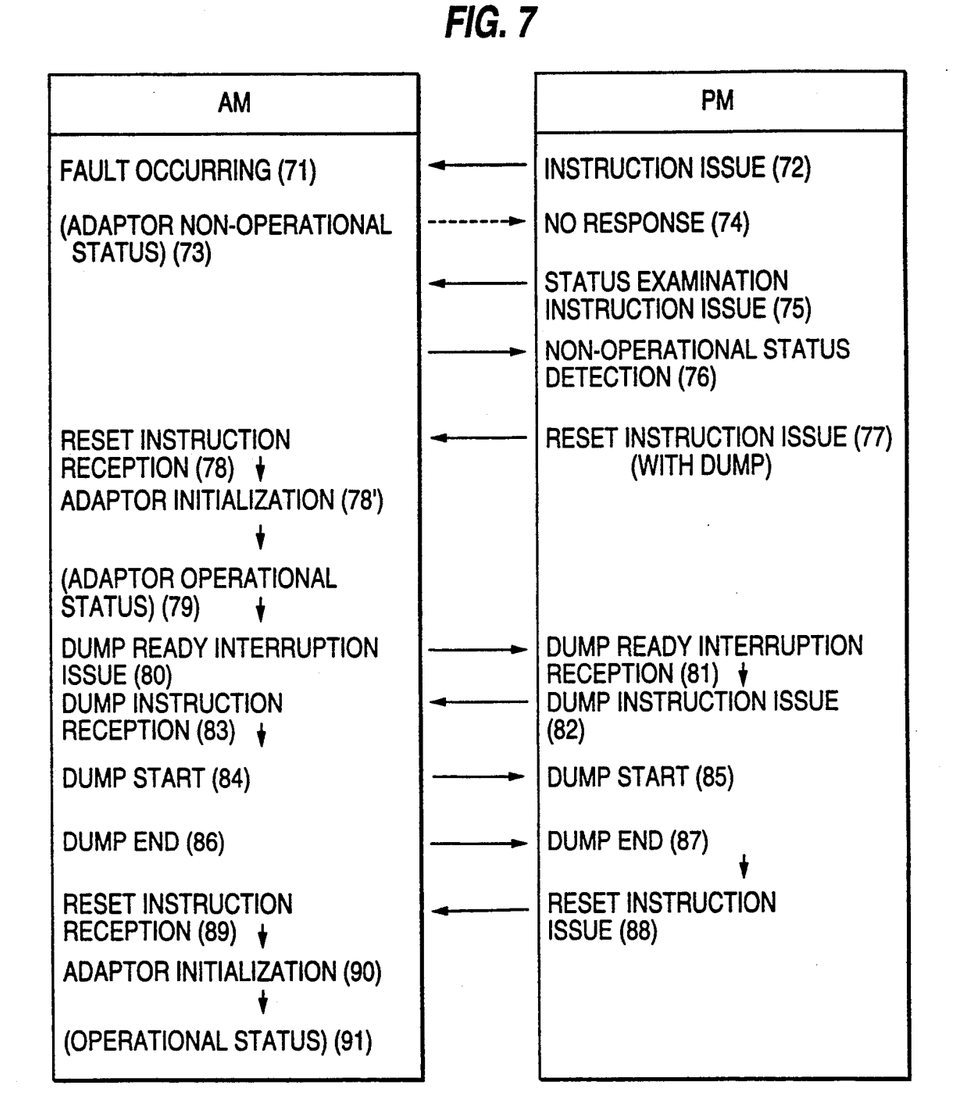
FIG. 7 is a diagram illustrating a process according to the second embodiment of the invention.

With reference to a flowchart in FIG. 7, the process steps in the dump restart in the AM2 are explained.

When the AM2 experiences a fault and the instruction (72) is issued from the PM1, since the AM2 is is a non-operational status (73), the response is not executed (74). Then, a status examination instruction is issued (75) and the non-operational status (76) of the AM2 is detected.

At that time, the PM1 issues (77) the reset instruction executing the dump process. When the reset instruction (78) is received in the AM2, the AM2 is initialized (78'). Namely, the AM2 is reset (78') except for the memory. The reset, in this case, is the same as explained in FIG. 6. By this reset, the AM2 attains an operational status (79). Then, the AM2 sends a request signal for the interruption of the dump ready to the PM1. In the dump ready interruption, the interface portion of the BC portion is operational, and the readiness of the dump is imparted to the PM. The PM1 receives (81) the request and issues (82) the dump instruction to the AM issuing the dump ready interruption. When the AM2 receives (83) the dump instruction, it starts to dump (84). Namely, the contents of the inner memory (RAM) in the AM2 are supplied (85) to the PM1 as fault information. After the dump is completed (86, 87), the reset instruction is issued to the AM from the PM 1. The reset instruction at this time is not the reset except for the inner memory at the step (77), and the memory is reset. Accordingly, the AM is completely initialized (90) and attains operational status.

A third embodiment of the invention is explained with reference to FIG. 8 and FIG. 9. Concerning FIGS. 1 to 3 and FIG. 6, the same figures as in the second embodiment are referred to. In this embodiment, at the reset of the AM2, a patch process is applied.

Figure 8:
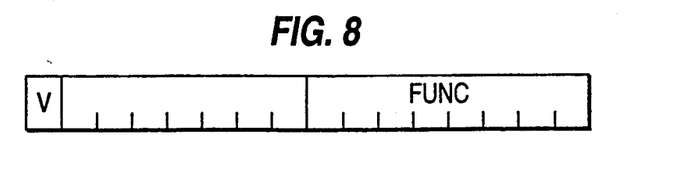
FIG. 8 is an explanatory diagram illustrating a function register in the adaptor module according to an embodiment of the invention.

In FIG. 8, the function register 205 in the AM2 is shown. If the AM2 receives the reset instruction from PM1, a valid bit (V) in the register is turned ON. At that time, the function code (FUNC) designates whether to patch or not to patch for the firmware. For example, if the function code is "00", the reset is without patching and if the function code is "01", the reset with patching is defined.

Figure 9:
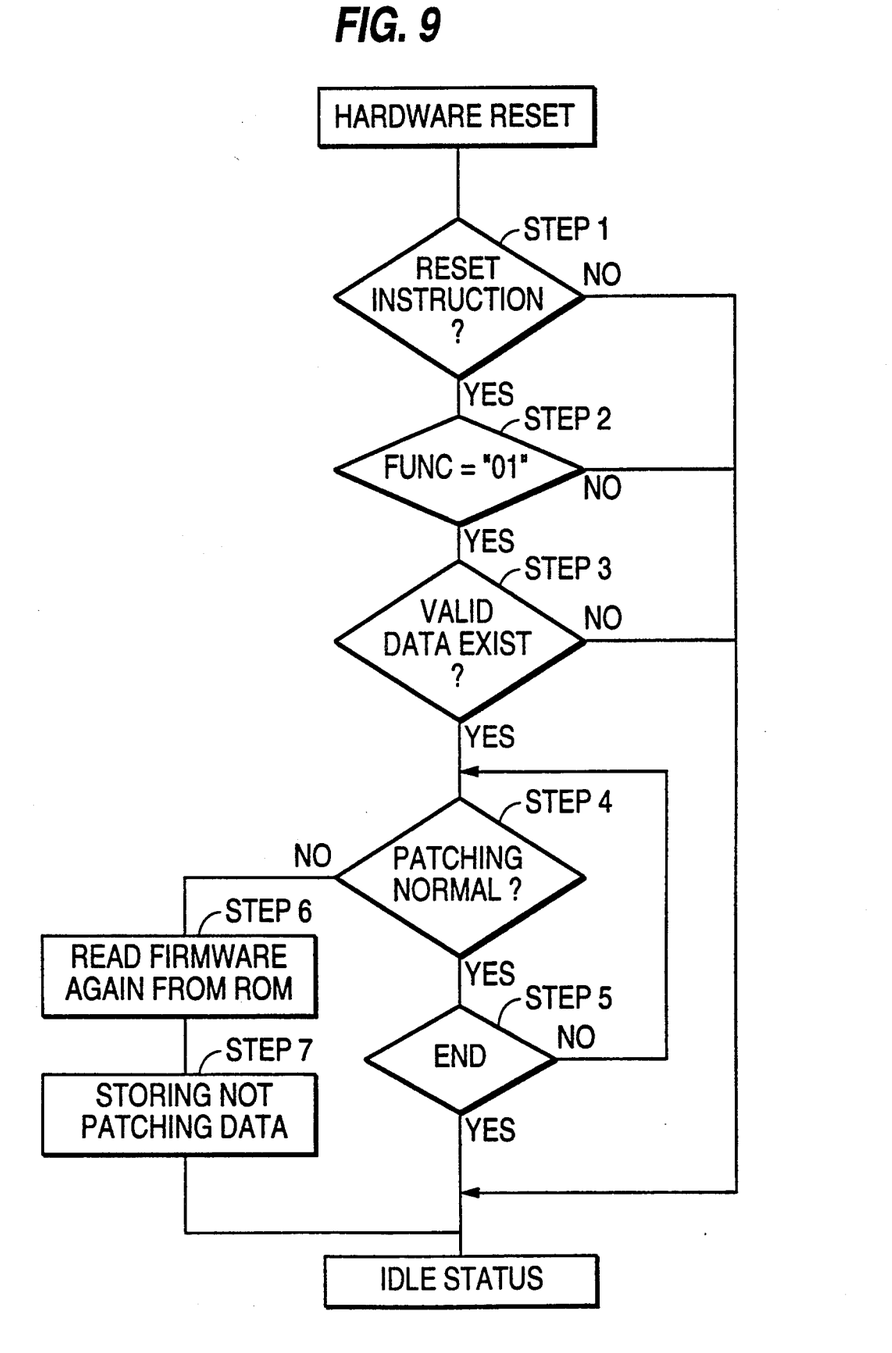
FIG. 9 is a flowchart of a process according to a third embodiment of the invention.

In FIG. 9, a flowchart of the patch process is shown.

After the AM2 receives the reset instruction (Step 1) and resets the minimum hardware by which the AM2 can operate, the firmware starts to operate. When the firmware starts to operate, the function register 205 in FIG. 8 is examined. If the valid bit is OFF (Step 2), because of no reset due to the instruction, the firmware is at an idle status and waits for the instruction from the PM1. If the valid bit is ON, the function code is examined. If the function code is "00", because of the reset without patching, the firmware attains an idle status as when the valid bit is OFF, and attains a status waiting for the instruction from the PM1.

If the function code is "01" (Step 2), the firmware reads management information in an EEPROM (Electrically Erasable Programmable Read Only Memory) in FIG. 3 and the information is examined whether it is valid (Step 3). If valid data exists, first, the firmware reads the edition number of the current firmware, and recognizes a coincidence with the edition number of the applied firmware (Step 4). If the coincidence is obtained, the data is changed and reads the data designated in the next address similarly. The change of the designated size is completed, and finally, the new edition number is stored.

When the new data is applied, if the data of the designated address does not coincide, the application is interrupted. Then, the firmware in a ROM (read only memory included in the control storage (CS) 211 in Fig. 3) is reloaded (Step 6), the edition number in the no patching is stored (Step 7), and the firmware attains an idle status. The starting of the firmware executing the patch can be discriminated by the instruction from the PM1.

Figure 10:
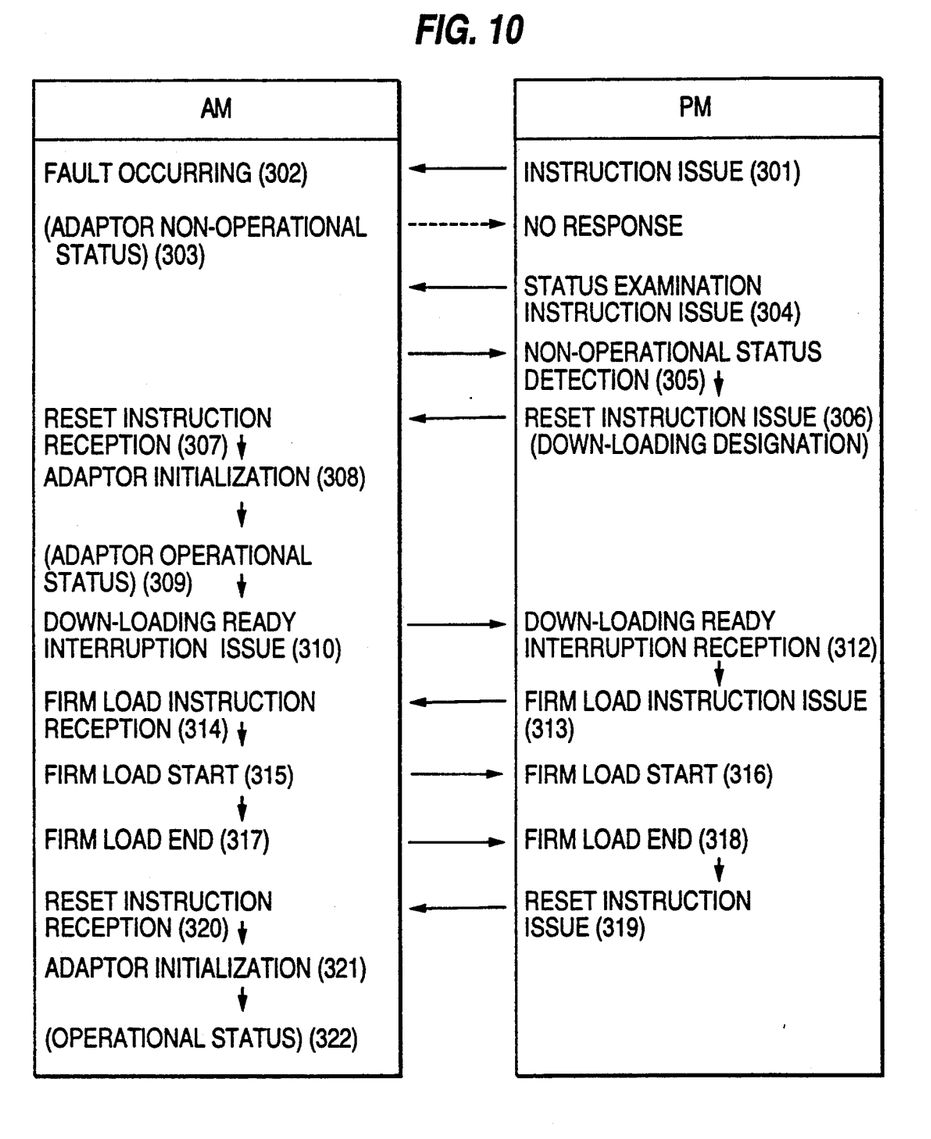
FIG. 10 is an explanatory diagram illustrating a process according to a fourth embodiment of the invention.

A fourth embodiment of the invention is explained with reference to FIG. 10. Compared with the third embodiment, only the process of the firmware is different and other aspects are the same. This embodiment relates to process steps executing the restart process by a down-loading. Namely, the firmware is down-loaded from an external source to the AM2 of ROM type.

In some AM2, the firmware controlling the AM2 is excessively large, and the firmware cannot be supplied by the ROM. This is the case of supporting many communication control sequences as in the line system, in the host computer, the sequence of the adaptor support is defined, and after the initial diagnosis only the necessary sequences are down-loaded. In the ROM of the AM2, the minimum program to down-load the firmware is stored. Usually, after the power source is turned ON, and simultaneously the initial diagnosis is completed, the program in the ROM starts and the firmware is down-loaded from the host computer. The down-loaded firmware develops in the RAM (Random Access Memory in FIG. 3) in the AM2; when simultaneously completing the down-loading, control is transferred to the firmware in the RAM and the operation starts. This type of adaptor module designates the down-loading of the firmware in the function code of the reset instruction.

The PM1 detecting the non-operational status of the AM2 issues the reset instruction (306) by designating the down-loading of the firmware in the parameter when the reset instruction is issued, since in this AM2 it is previously known that it must be down-loaded in the firmware. The AM2 receiving (307) the reset instruction turns the signal ON, which resets various portions other than the memory, and the AM2 is initialized (308). When the reset is completed, the AM2 attains operational status (309) after the initial diagnosis, issues (310) a down-loading ready interruption to the PM1 issuing the reset instruction, and waits for the firmware load instruction. The PM1 receives (312) the down-loading ready interruption. At this time, the AM2 waits only for the firmware load instruction from the PM1 issuing the instruction, responds that it is busy to the instruction from the other PM1, and does not receive the instruction. The PM1 issues (313) the firmware load instruction. The AM receives (314) the firm load instruction and the adaptor down-loads (317) the firmware from the PM1. When the PM1 completes (317) the down-loading the PM1 issues (319) the reset instruction, which does not designate the operation after reset. The above down-loading process steps are shown in FIG. 10.

By using the above embodiments, when the non-operational status is set in the status register (STR) of the interface portion in the AM2, if the reset instruction issued by the PM1 is received, the reset signal outputs to initialize the AM2, and the AM2 can be reset without operators and the software.

Also, when the reset instruction is received and the reset signal is output, the data information included in the reset instruction is set in the special function register (FRG), and, for example, the AM2 is initialized to execute the dump instruction. Further, by providing various contents of the function register (FRG), the reset operation having various states can be carried out.

We claim:

1. A reset method for causing a reset operation when an adaptor module is faulty, in a computer system having processor modules, adaptor modules, a system bus connecting the processor modules and the adaptor modules and a plurality of devices or lines connected to the adaptor modules, said method comprising the steps of:

(a) receiving and decoding instructions issued from one of the processor modules in an interface portion of at least one of the adaptor modules and controlling the connection to the one of the processor modules, and controlling data transfer between the system bus and the devices or lines based on the decoded information from the interface portion;

(b) issuing a reset instruction from the one of the processor modules having a code selectively designating types of reset operations in the reset instruction, to the at least one of the adaptor modules;

(c) receiving a reset instruction issued by the one of the processor modules at the interface portion of the at least one of the adaptor modules via the system bus; and (d) executing reset operations in the at least one of the adaptor modules in accordance with the types of operations selectively designated by the code in the reset instruction.

2. A method as set forth in claim 1, wherein:
the code of the reset instruction in step (b) resets only predetermined portions of the at least one of the adaptor modules, and
in step (d), only portions designated by the code are reset.

3. A method as set forth in claim 1, wherein:
each of the adaptor modules has a ROM storing firmware, a RAM storing the firmware and the data of the ROM, and further a patch memory storing a patch program including correct/update data of the firmware program stored in the ROM;
the code of the reset instruction in step (b) designates whether the patch program is applied to the firmware; and
in step (d), after the at least one of the adaptor modules in reset and when the code designates the patch operation, data applying the patch program to the ROM are developed in the RAM, and when no application of the patch is designated, the contents of the ROM are developed in the RAM.

4. A method as set forth in claim 1, wherein:
each adaptor module has a ROM storing firmware, a RAM storing the firmware and data of the ROM;
the code of the reset instruction in step (b) designates whether the firmware stored in the RAM is the contents of the ROM or an instruction given from the one of the processor modules; and
in step (d), after the at least one of the adaptor modules is reset and when the code designates that the ROM data is stored in the RAM, the ROM data is developed in the RAM, and when the code designates that the firmware transferred from the one of the processor modules is loaded in the RAM, the data from the one of the processor modules is transferred and, then, the data is stored in the RAM.

5. A method as set forth in claim 2, further comprising the steps of:
(e) having the one of the processor modules request dumping of the log information from the at least one of the adaptor modules; and
(f) after the at least one of the adaptor modules receives the request, transmitting log information from a portion of the at least one of the adaptor modules which is not reset in step (d) from the at least one of the adaptor modules to the one of the processor modules.

6. A method as set forth in claim 5, further comprising the steps of:
(f) transmitting, from the one of the processor modules, a reset instruction, designating the types of the code of the reset instruction designated by step (b) to reset all portions of the at least one of the adaptor modules, to the at least one of the adaptor modules; and
(g) after step (f) and after the at least one of the adaptor modules receives the reset instruction, resetting all portions of the at least one of the adaptor modules.

7. A method as set forth in claim 1, wherein
the first step issues reset instruction having the flag or code designating transfer of faulty information of the adaptor module to the processor module, and
the third step transfers the faulty information of the adaptor module to the processor module and processes to reset when the reset instruction having the code is received.

8. A computer system having processor modules, adaptor modules, a system bus connecting the processor modules and the adaptor modules, and a plurality of devices or a plurality of lines connected to the adaptor modules; each of the adaptor module has an interface portion for receiving and decoding instruction issued from the processor module and for controlling the connection to the processor module and an adaptor control portion for controlling data transfer between the system bus and the devices or lines based on the decoded information from the interface portion; comprising:
a status display means provided in the interface portion of the adaptor module, for designating that the adaptor module has attained a special status;
a reset instruction issuing means for issuing a reset instruction, which is an instruction for resetting the adaptor and which includes a flag or code designating a special operation after resetting when the processor module detects the special status designated by the status display means of the adaptor module; and
a means for decoding the reset instruction and for issuing the reset signal corresponding to the code to a device in the adaptor module when the interface portion receives the reset instruction.

9. A computer system as set forth in claim 8, wherein the reset instruction issuing means issues the reset instruction including a code that designates not to reset a special device in the adaptor.

10. A computer system as set forth in claim 8, wherein
the adaptor module comprises a ROM for storing a firmware, a RAM for storing the firmware stored in the ROM, and a corrected firmware storing memory for storing a corrected data of the firmware data stored in the ROM;
the adaptor module develops the data stored in the ROM and the corrected firmware storing memory in the RAM, and executes the firmware;
the reset instruction issuing means issues reset instruction including a code that designates whether the firmware stored in the RAM is only the data of the ROM or the corrected firmware and the data of the ROM;
after the reset signal is issued, the system has a means for storing the firmware data to the RAM from the ROM or the corrected firmware storing memory in accordance with the code, when the interface portion receives the reset instruction.

11. A computer system as set forth in claim 7, wherein:

the adaptor module has a RAM storing a firmware and executes the firmware;

the instruction data supply means issues the reset instruction including a code that designates that the firmware is supplied from the processor module or an external device, to the adaptor module;

after the interface portion receives the reset instruction and issues the reset signal, when the code designates that the reset instruction, including a code that designates that the firmware is supplied from the processor module or the external device, is issued to the adaptor module, the generation means attains waiting status for firmware transfer;

the firmware provided in the processor module or the external device is supplied to the adaptor module; and the adaptor module develops the provided firmware in the RAM when the adaptor module is in the status.

12. A computer system as set forth in claim 7, wherein the instruction data supply means issues the reset instruction including a code that designates that faulty information in the adaptor module is transferred to the processor module.

* * * * *

UNITED STATES PATENT AND TRADEMARK OFFICE
CERTIFICATE OF CORRECTION

PATENT NO. : 5,321,830
DATED : June 14, 1994
INVENTOR(S) : Youichi NAKAMURA et al.

It is certified that error appears in the above-indentified patent and that said Letters Patent is hereby corrected as shown below:

Column 1, line 42, after "same" insert --,--;

Column 2, line 7, change "instruction" to --instructions--;

Column 2, line 65, delete ", further,";

Column 2, line 66, change "various" to --Various--;

Column 3, line 53, change ";" to --.--;

Column 3, line 54, change "wherein" to --When an--;

Column 4, line 16, after "module" insert --1--; before "dump" insert --a--;

Column 5, line 7, change "becomes" to --enters--;

Column 5, line 42, change "," to --.--;

Column 6, line 64, change "is is" to --is in--;

Column 7, line 19, after "reset" insert --,--;

Column 8, line 48, after "down-loading" insert --,--.

Signed and Sealed this

Twenty-fifth Day of October, 1994

Attest:

BRUCE LEHMAN

*Attesting Officer*      *Commissioner of Patents and Trademarks*